(12) United States Patent
Ishibashi et al.

(10) Patent No.: US 10,550,912 B2
(45) Date of Patent: Feb. 4, 2020

(54) TORSIONAL VIBRATION DAMPER

(71) Applicant: TOYOTA JIDOSHA KABUSHIKI KAISHA, Toyota-shi (JP)

(72) Inventors: Masayuki Ishibashi, Numazu (JP); Hiroyuki Amano, Susono (JP); Tomo Iwagaki, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/207,231

(22) Filed: Dec. 3, 2018

(65) Prior Publication Data
US 2019/0170212 A1 Jun. 6, 2019

(30) Foreign Application Priority Data

Dec. 6, 2017 (JP) .................................. 2017-234336

(51) Int. Cl.
*F16F 15/14* (2006.01)
(52) U.S. Cl.
CPC ........ *F16F 15/145* (2013.01); *F16F 2222/08* (2013.01); *F16F 2234/02* (2013.01)
(58) Field of Classification Search
CPC ...... F16F 15/14; F16F 15/1407; F16F 15/145; F16F 15/1457; F16F 15/165; F16F 15/167; F16F 15/173; F16F 2222/08; F16F 2234/02
See application file for complete search history.

(56) References Cited

U.S. PATENT DOCUMENTS

| 2,280,364 A * | 4/1942 | Atteslander ............. F16F 15/14 74/574.3 |
| 9,145,947 B2 * | 9/2015 | Amano .................... F16H 45/02 |
| 9,803,718 B2 * | 10/2017 | Miyahara .............. F16F 15/145 |

(Continued)

FOREIGN PATENT DOCUMENTS

| DE | 102013212522 A1 * | 12/2014 | .......... F16F 15/1457 |
| DE | 102016212176 A1 * | 1/2018 | .............. F16F 15/14 |

(Continued)

OTHER PUBLICATIONS

Machine translation of JP 2012-145190 A obtained on Feb. 20, 2019.*

(Continued)

*Primary Examiner* — Adam D Rogers
(74) *Attorney, Agent, or Firm* — Oblon, McClelland, Maier & Neustadt, L.L.P.

(57) ABSTRACT

A torsional vibration damper includes a rotary member rotated by torque, an inertia body rotated relatively on an outer radial side of the rotary member due to torque pulse, and a rolling member coupled to the rotary member and the inertia body. The rotary member includes support sections that are provided on its outer radial side, and by which the rolling member is restricted in a rotating direction of the rotary member and is engaged movably in a radial direction of the rotary member. The inertia body includes: a pair of mass sections respectively projecting toward both sides in an axial direction; and a pair of raceway surfaces on which the rolling member rolls. A center of curvature of each raceway surface is deviated from a rotational center of the rotary member.

6 Claims, 6 Drawing Sheets

(56) References Cited

U.S. PATENT DOCUMENTS

| | | | | |
|---|---|---|---|---|
| 9,829,065 B2* | 11/2017 | Suzuki | ............... | F16F 15/145 |
| 9,958,027 B2* | 5/2018 | Sekiguchi | ............... | F16H 45/02 |
| 10,001,192 B2* | 6/2018 | Horita | ............... | F16F 15/145 |
| 2016/0169320 A1 | 6/2016 | Suzuki et al. | | |
| 2017/0234401 A1 | 8/2017 | Horita et al. | | |
| 2018/0119773 A1* | 5/2018 | Nishida | ............... | F16F 15/145 |
| 2018/0306271 A1* | 10/2018 | Horita | ............... | F16F 15/145 |
| 2018/0347662 A1* | 12/2018 | Iwane | ............... | F16F 15/145 |
| 2019/0048971 A1* | 2/2019 | Nishida | ............... | F16F 15/145 |
| 2019/0048972 A1* | 2/2019 | Iwagaki | ............... | F16F 15/1457 |
| 2019/0285136 A1* | 9/2019 | Ishibashi | ............... | F16F 15/1457 |

FOREIGN PATENT DOCUMENTS

| | | | | | |
|---|---|---|---|---|---|
| DE | 102016124814 A1 * | 6/2018 | | ............ | F16F 15/145 |
| JP | 2012145190 A * | 8/2012 | | | |
| JP | 2013185598 A * | 9/2013 | | .......... | F16F 15/1457 |
| JP | 2016-114171 | 6/2016 | | | |
| JP | 2017-145857 | 8/2017 | | | |

OTHER PUBLICATIONS

Machine translation of JP 2013-185598 A obtained on Feb. 20, 2019.*

* cited by examiner

TORSIONAL VIBRATION DAMPER

CROSS-REFERENCE TO RELATED APPLICATIONS

The present invention claims the benefit of Japanese Patent Application No. 2017-234336 filed on Dec. 6, 2018 with the Japanese Patent Office, the disclosure of which is incorporated herein by reference in its entirety.

BACKGROUND

Field of the Disclosure

The present disclosure relates to a torsional vibration damper that reduces a torsional vibration resulting from a pulsation of an inputted torque.

Discussion of the Related Art

Up to now, there is known a torsional vibration damper in which a torsional vibration resulting from a torque pulse is reduced by a reciprocating motion (pendulum motion) of a mass body (refer to JP-A-2017-145857, for example). This kind of damper includes: a rotating body inputted with a torque; an inertia body that rotates relatively to the rotating body due to the torque fluctuation; and a coupling member that couples the rotating body and the inertia body in a manner enabling torque transmission. Moreover, a first coupling section is formed on either one of the rotating body and the inertia body. The first coupling section restricts the coupling member in a rotating direction of the rotating body and engages the coupling member movably in a radial direction of the rotating body. Furthermore, a second coupling section is formed on the other one of the rotating body and the inertia body. The second coupling section engages with the coupling member. When the rotating body and the inertia body rotate relatively, a place of contact on the first coupling section of the coupling member undergoes displacement in the radial direction of the rotating body, whereby the coupling member engages in the first coupling section and the second coupling section.

In the previously mentioned torsional vibration damper, downsizing and increasing a mass of the mass body to improve attenuation performance of low frequency vibration, are desired. In FIG. 15 described in JP-A-2017-145857, there is described an embodiment having a configuration in which two inertia bodies have been arranged on both sides of the rotating body. In that embodiment, each of the inertia bodies has formed therein two coupling sections (raceway surfaces) against which the coupling member (rolling member) is pressed by a centrifugal force due to the rotating body rotating. The second coupling section is configured as an arc surface of a certain radius of curvature centered on a place deviating from a rotational center of the rotating body. In this kind of damper, it is desired to increase a mass of the coupling member to improve attenuation performance of low frequency vibration.

Increasing of mass for improving attenuation performance with respect to low frequency vibration is, in short, to increase an inertia moment of the inertia body or coupling member. In the damper described in JP-A-2017-145857, since two inertia bodies of the same size are used, the mass overall of the inertia body gets larger. However, in the configuration described in JP-A-2017-145857, by increasing the number of inertia bodies, the damper ends up increasing in size. That is, up to now, there has been room for improvement in increasing the inertia moment to improve vibration attenuation performance with respect to low frequency vibration without causing an increase in size of the damper.

SUMMARY

The present disclosure was made noting the above-described technical problems, and has an object of providing a torsional vibration damper in which attenuation performance of low frequency vibration can be improved.

Embodiments of the present disclosure relates to a torsional vibration damper, comprising: a rotary member that rotates by being inputted with a torque; an inertia body disposed on an outside in a radial direction of the rotary member so as to rotate freely in a circumferential direction centered on a rotational center axis of the rotary member; and a rolling member that couples the rotary member and the inertia body in a relatively-rotatable manner. In the torsional vibration damper, torsional vibration of the rotary member is suppressed by relative rotation of the inertia body with respect to the rotary member. In order to achieve the above-described object, the rotary member includes in its outer circumferential section a plurality of support sections by which the rolling member is restricted in a rotating direction of the rotary member and is engaged movably in the radial direction of the rotary member. In addition, the inertia body includes: a pair of mass sections that project toward both sides in a direction of the rotational center axis of the rotary member with respect to the rotary member; and a pair of raceway surfaces that are respectively provided on an inside in the radial direction of the pair of mass sections in a manner enabling the pair of raceway surfaces to be abutted on by the rolling member, the pair of raceway surfaces having a center of curvature in a place deviating from a rotational center of the rotary member.

In a non-limiting embodiment, there may be included an aligning section by which at least one of the rolling member and the inertia body is moved in a direction of the rotational center axis.

In a non-limiting embodiment, the rolling member may include: a diametrically small section that engages in the support section; and a pair of diametrically large sections provided on both sides sandwiching the diametrically small section so as to respectively abut on the raceway surfaces. On the other hand, the aligning section may include: a pair of surfaces that are faced by the pair of diametrically large sections; and a tapered surface provided to at least one of a pair of surfaces on an inertia body side facing the pair of surfaces.

In a non-limiting embodiment, the pair of mass sections may be provided with a pair of restricting members that restrict the rolling member in a certain range in a direction of the rotational center axis.

In a non-limiting embodiment, the rolling member may be lubricated by an oil, and the inertia body may include a wall that prevents hindrance to rolling motion of the rolling member due to the oil.

In a non-limiting embodiment, the rolling member may be lubricated by an oil, and the inertia body may include a cover member that prevents hindrance to rolling motion of the rolling member due to the oil.

Due to the present invention, an inertia body disposed on an outside in a radial direction of a rotary member includes a pair of mass sections provided projecting toward both sides in a direction of a rotational center axis of the rotary member with respect to the rotary member, hence a mass of a portion on an outside in the radial direction in the inertia body can be increased. Moreover, since the pair of mass sections are each provided with a raceway surface abutted on by the rolling member, then surface pressures of the raceway surfaces can be lowered more, whereby strength or durability thereof can be improved more, compared to when, for example, abutting of the rolling member is received by one raceway surface.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
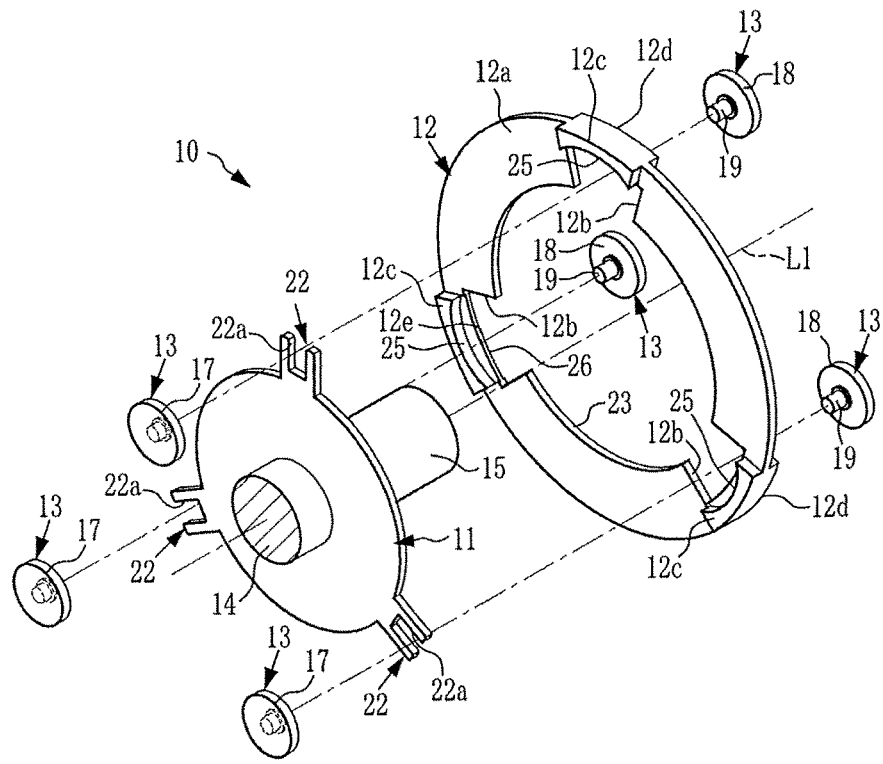
FIG. 1 is a perspective view showing one example of a torsional vibration damper according to an embodiment of the present invention.

FIG. 1 is a perspective view showing one example of a torsional vibration damper according to an embodiment of the present disclosure. As shown in FIG. 1, a torsional vibration damper 10 includes a rotary member 11, an inertia body 12, and a plurality of rolling members 13. A torque outputted from a prime mover of a vehicle, for example, an engine, is transmitted to the rotary member 11. The torsional vibration damper 10 rotates the inertia body 12 relatively with respect to the rotary member 11 in response to a pulsation of the torque, and thereby reduces or suppresses a torsional vibration of the rotary member 11 resulting from the torque pulse. The rotary member 11 includes an input shaft 14 that is inputted with the torque and an output shaft 15 that outputs the torque after its torsional vibration has been reduced.

The rolling member 13 is configured by integrally coupling an annular-shaped first diametrically large section 17 and an annular-shaped second diametrically large section 18 through a shaft 19. The rolling member 13 couples the rotary member 11 and the inertia body 12 in a manner enabling torque transmission. The first diametrically large section 17 and the second diametrically large section 18 have their sizes, including diameters, thicknesses, and masses, configured to be the same. The shaft 19 is configured to be of smaller diameter than the first diametrically large section 17 and the second diametrically large section 18, and is one example of a diametrically small section in the embodiments of the present disclosure.

A support section 22 is formed in each of a plurality of positions (equal division positions) equally dividing a circumference centered on a rotational axis (rotational center axis) L1, in the rotary member 11. The number of support sections 22 is the same as the number of rolling members 13. The support section 22 has a guide groove 22a formed by a fork-shaped portion of the support section 22 extending outwardly in a radial direction. The shaft 19 is fitted in the guide groove 22a, and the guide groove 22a guides the rolling member 13 in the radial direction. Although the number of rolling members 13 is described as three in FIG. 1, the present disclosure is not limited to this, and there may be four or more, for example, or there may be two.

The inertia body 12 includes an annular plate section 12a, a hole 23, a notch 12b, a first raceway surface 25, and a second raceway surface 26, and this inertia body 12 is disposed in a rotatable manner on an outer circumferential side of the rotary member 11. The inertia body 12 is coupled to the rotary member 11 by the rolling member 13, and rotates in the same direction as the rotary member 11 due to a torque transmitted from the rotary member 11. The hole 23 is formed with a size that the rotary member 11 enters its inside. The notch 12b is formed cut out in such a manner that part of the plate section 12a opens on an inner circumferential side. The notch 12b is formed in the equal division positions in the circumferential direction centered on the rotational axis L1. The number of notches 12b is the same as the number of support sections 22. The support section 22 and the rolling member 13 enter the notch 12b. Note that the plate section 12a may be configured thicker than the rotary member 11, or the rotary member 11 and plate section 12a may be configured having substantially the same thickness.

Figure 2:
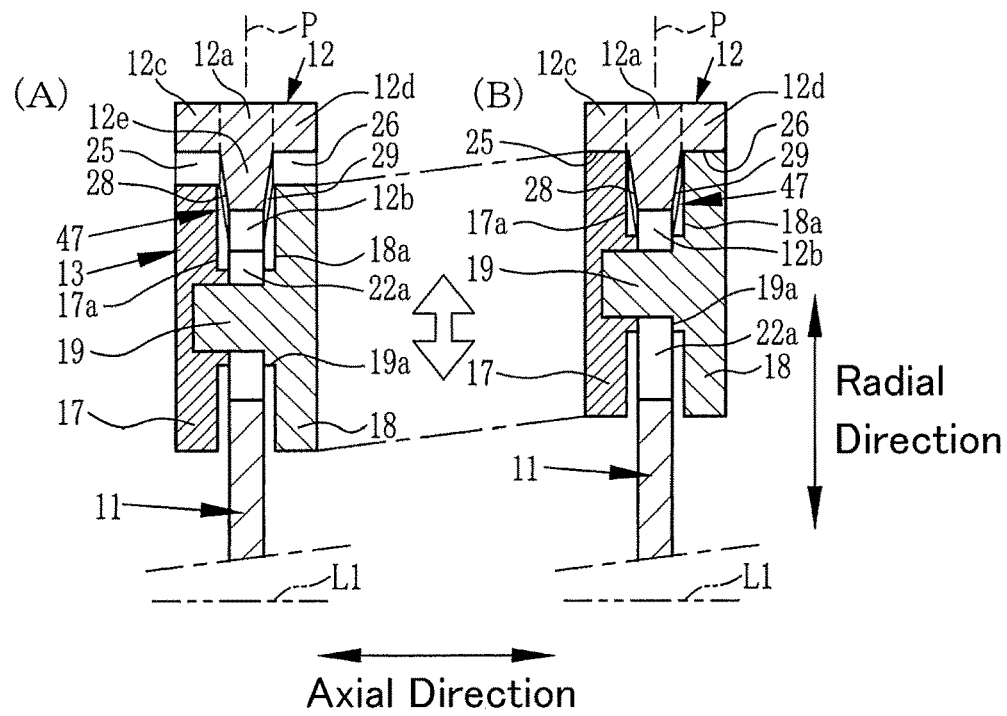
FIG. 2 is a cross-sectional view showing essential parts of the torsional vibration damper shown in FIG. 1.

FIG. 2 is a cross-sectional view showing essential parts of the torsional vibration damper shown in FIG. 1. FIG. 2(A) shows a state where the rolling member 13 has moved to end sections of the raceway surfaces 25, 26, and FIG. 2(B) shows a state where the rolling member 13 has moved to a position most separated from a rotational center of the rotary member 11 in the raceway surfaces 25, 26. The inertia body 12 includes a first bulging section 12c and a second bulging section 12d that jut out to both sides in the axial direction from the plate section 12a.

Moreover, a partition wall section 12e is formed in a portion on an inside in the radial direction of the plate section 12a, in other words, between the plate section 12a and the notch 12b. The partition wall section 12e is formed projecting inwardly in the radial direction from the plate section 12a. The plate section 12a, the first bulging section 12c, the second bulging section 12d, and the partition wall section 12e configure a substantially T-shaped cross section. The first raceway surface 25 is formed on an inner circumferential surface of the first bulging section 12c. The second raceway surface 26 is formed on an inner circumferential surface of the second bulging section 12d.

The plate section 12a, the first bulging section 12c, and the second bulging section 12d are provided in a position on the outside in the radial direction of the rotary member 11 overlapping a range that the rolling member 13 or rotary member 11 (support section 22) have been disposed in the axial direction of the rotational axis L1 of the rotary member 11. The first bulging section 12c and the second bulging section 12*d* may be formed with such a length that their length in the circumferential direction centered on the rotational axis L1 corresponds to a length of the notch 12*b*. In this case, each of the plurality of notches 12*b* may be provided with the first bulging section 12*c* and the second bulging section 12*d*. Note that the first bulging section 12*c* and the second bulging section 12*d* may be provided linked over an entire circumference of the inertia body 12. The first bulging section 12*c* and the second bulging section 12*d* are one example of a mass section in the embodiments of the present disclosure.

The rolling member 13 is formed with a substantially H-shaped cross section. In other words, the first diametrically large section 17 and the second diametrically large section 18 are formed with the same shape and the same mass, and are disposed such that weights or moments on both sides sandwiching the shaft 19 are in balance. A length of the shaft 19 is formed longer than a plate thickness of the inertia body 12. Therefore, the first diametrically large section 17 and the second diametrically large section 18 are disposed on both sides in the axial direction sandwiching the guide groove 22*a*. A centrifugal force due to the rotary member 11 rotating results in the rolling member 13 moving outwardly in the radial direction while the shaft 19 is guided by the guide groove 22*a*. When the rolling member 13 moves outwardly in the radial direction in this way, an outer circumferential surface of the first diametrically large section 17 makes line contact with the first raceway surface 25, and an outer circumferential surface of the second diametrically large section 18 makes line contact with the second raceway surface 26.

Shapes of the first raceway surface 25 and the second raceway surface 26 are each an arc surface of smaller radius of curvature than a radius of the inertia body 12, or a curved surface approximated to the arc surface. In other words, the first raceway surface 25 and the second raceway surface 26 are each formed in an arc surface having a center of curvature in a place deviating from the rotational center of the rotary member 11, or a curved surface approximated to the arc surface.

When the rotary member 11 rotates along with the inertia body 12, a centrifugal force acts on the rolling member 13, and the rolling member 13 moves to a position (a neutral position) most separated from the rotational center of the rotary member 11, of the raceway surfaces 25, 26. When the rotary member 11 undergoes torsional vibration resulting from torque pulse, the rolling member 13 rolls in the circumferential direction on the raceway surfaces 25, 26. Consequently, the inertia body 12 is oscillated in a rotating direction of the rotary member 11 in a reverse phase to that of the oscillation of the rotary member 11, or with a slight delay behind the oscillation of the rotary member 11. As a result, the vibration acting on the rotary member 11 is attenuated.

A first tapered surface 28 and a second tapered surface 29 are formed on both sides in the axial direction, in the partition wall section 12*e*. The first tapered surface 28 is abutted on by an inner surface 17*a* of the first diametrically large section 17 when the rolling member 13 has moved to the right in FIG. 2. The first tapered surface 28 is inclined in an orientation that, by the first tapered surface 28 being abutted on by the inner surface 17*a*, the rolling member 13 is drawn toward a line P passing through a center in the axial direction of the shaft 19 in the rolling member 13 and a center in the axial direction in the first bulging section 12*c* and the second bulging section 12*d*. The second tapered surface 29 is abutted on by an inner surface 18*a* of the second diametrically large section 18 when the rolling member 13 has moved to the left shown in FIG. 2. The second tapered surface 29 is inclined in an orientation that, by the second tapered surface 29 being abutted on by the inner surface 18*a*, the center in the axial direction of the shaft 19 in the rolling member 13 is drawn toward the line P. The inner surface 17*a*, the inner surface 18*a*, the first tapered surface 28, and the second tapered surface 29 configure an aligning section 47. The aligning section 47 performs alignment so as to match the center in the axial direction of the rolling member 13 and the center in the axial direction of the inertia body 12 when the rolling member 13 rolls along the first raceway surface 25 and the second raceway surface 26, and the aligning section 47 thereby corrects a deviation in the axial direction of the rolling member 13 and the inertia body 12. As a result, a sliding resistance of the rolling member 13 and the inertia body 12 is reduced. Therefore, vibration damping performance of the torsional vibration damper 10 improves.

Moreover, by a shift in the axial direction with respect to the inertia body 12 of the rolling member 13 being corrected by the aligning section 47, so-called partial contact where only either one of the first diametrically large section 17 and first raceway surface 25, and the second diametrically large section 18 and second raceway surface 26 make contact, is reduced or prevented, whereby behavior of the torsional vibration damper 10 stabilizes. Therefore, a force transmitted to the raceway surfaces 25, 26 from the rolling member 13 can be equally divided between the first raceway surface 25 and the second raceway surface 26. As a result, loads applied to the raceway surfaces 25, 26 from the rolling member 13 equalize, whereby lack of strength or lowering of durability of the first raceway surface 25 and the second raceway surface 26 can be prevented or avoided. Optionally, the shaft 19 of the rolling member 13 may be provided with a groove 19*a* that fits in the guide groove 22*a*.

Figure 3:
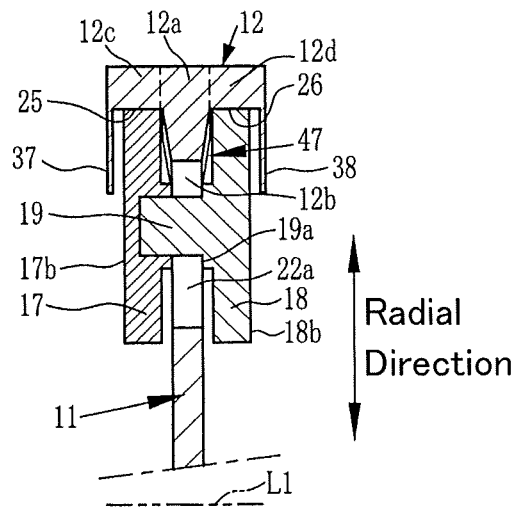
FIG. 3 is a cross-sectional view showing an example where a position in an axial direction of a rolling member is restricted.

FIG. 3 is a cross-sectional view showing an example where a position in the axial direction of the rolling member is restricted. Both the left side and right side of the rolling member 13 shown in FIG. 3 are respectively provided with a first restricting member 37 and a second restricting member 38 that restrict the position in the axial direction of the shaft 19. The first restricting member 37 and the second restricting member 38 are formed integrally with the pair of bulging sections 12*c*, 12*d*. Note that the first restricting member 37 and the second restricting member 38 may be provided separately from the pair of bulging sections 12*c*, 12*d*. The first restricting member 37 and the second restricting member 38 are disposed so as to cover part or all of side surfaces 17*b*, 18*b* of the rolling member 13. Note that in FIG. 3, members that are the same as or similar to those described by FIGS. 1 and 2, are assigned with the same symbols as those assigned in FIGS. 1 and 2, and a detailed description of such members will be omitted here.

Next, an example configured such that the torsional vibration damper 10 is immersed in an oil, or the oil is supplied forcibly or indirectly to the rolling member 13 or raceway surfaces 25, 26, will be described. In the torsional vibration damper 10 of the above-mentioned configuration, the inertia body 12 oscillates in the rotating direction in response to a pulsation in the input torque. That inertia body 12 is an annular plate, as mentioned above. Therefore, the oil mainly undergoes a shearing action due to vibration in the rotating direction of the inertia body 12. In this situation, a rolling motion of the rolling member 13 may be hindered by resistance of the oil, hence deterioration of vibration-attenuating performance sometimes occurs due to resistance of the oil.

Figure 4:
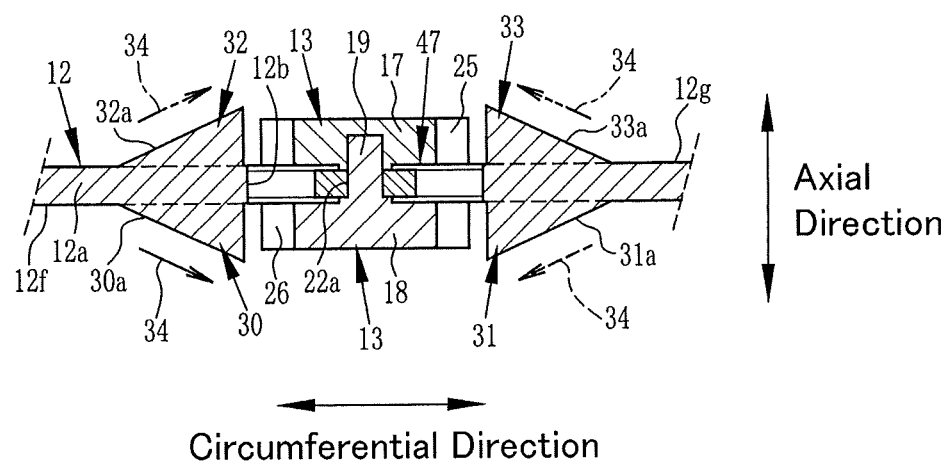
FIG. 4 is a cross-sectional view showing an example where inhibition of rolling of the rolling member due to resistance of an oil has been reduced.

FIG. 4 is a cross-sectional view showing an example configured such that the rolling motion of the rolling member will not be hindered by resistance of the oil. As shown in FIG. 4, the inertia body 12 includes a first wall 30, a second wall 31, a third wall 32, and a fourth wall 33. The first wall 30 and the second wall 31 are attached to a first surface 12f on one side sandwiching a center in the axial direction in the annular plate section 12a of the inertia body 12, on both sides in the circumferential direction sandwiching the notch 12b.

The first wall 30 includes a first tapered surface 30a. The first tapered surface 30a changes a flow of oil of an oil 34 directed from a one side in the circumferential direction toward the second diametrically large section 18, to a flow of oil directed in a direction of separating from the rolling member 13 (a direction of the arrow 34). The second wall 31 includes a second tapered surface 31a. The second tapered surface 31a changes a flow of oil of the oil 34 directed from an other side in the circumferential direction toward the second diametrically large section 18, to a flow of oil directed in the direction of separating from the rolling member 13 (the direction of the arrow 34).

The third wall 32 and the fourth wall 33 are fixed to a second surface 12g on the other side sandwiching the center in the axial direction in the annular plate section 12a, on both sides in the circumferential direction sandwiching the notch 12b. The third wall 32 includes a third tapered surface 32a. The third tapered surface 32a changes a flow of oil of the oil 34 directed from the one side in the circumferential direction toward the first diametrically large section 17, to a flow of oil directed in the direction of separating from the rolling member 13 (the direction of the arrow 34).

The fourth wall 33 includes a fourth tapered surface 33a. The fourth tapered surface 33a changes a flow of oil of the oil 34 directed from the other side in the circumferential direction toward the first diametrically large section 17, to a flow of oil directed in the direction of separating from the rolling member 13 (the direction of the arrow 34).

Thus, in the torsional vibration damper 10, by providing the inertia body 12 with the first wall 30 through fourth wall 33, the rolling member 13 can be shielded from a relative flow of the oil 34, and hence the rolling motion of the rolling member 13 will not be hindered by the oil 34. Therefore, even if the rolling members 13 are in oil, a reduction in the torsional vibration-reducing performance can be prevented. Moreover, by providing the first wall 30 through fourth wall 33, a mass on the outside in the radial direction of the inertia body 12 increases, hence a sufficient inertia moment can be obtained. Note that the first wall 30 through fourth wall 33 may be provided integrally with the inertia body 12. The first wall 30 through fourth wall 33 may all be of the same shape and same mass. In FIG. 4, members that are the same as or similar to those described by FIGS. 1 and 2, are assigned with the same symbols as those assigned in FIGS. 1 and 2, and a detailed description of such members will be omitted here. The first wall 30 through fourth wall 33 are one example of a wall in the embodiments of the present disclosure.

Figure 5:
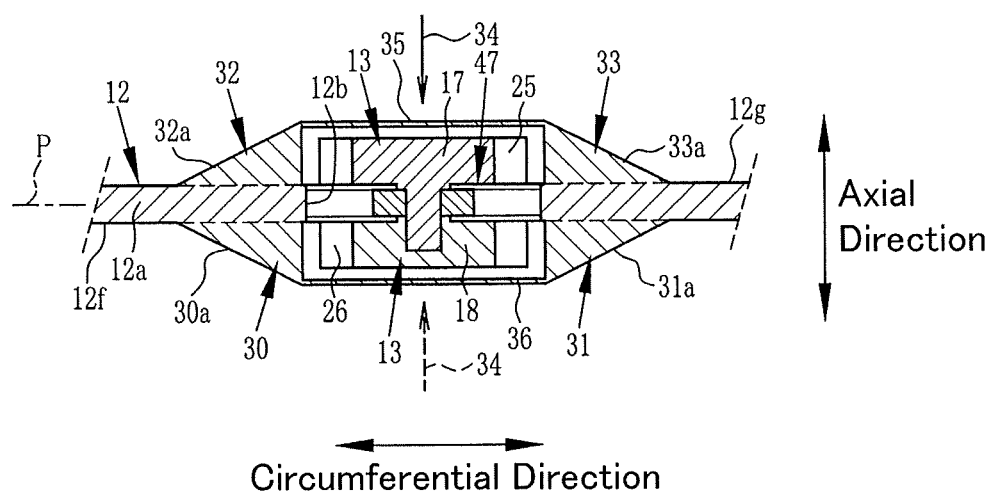
FIG. 5 is a cross-sectional view showing another example where inhibition of rolling of the rolling member due to resistance of the oil has been reduced.

FIG. 5 is a cross-sectional view showing another example where the rolling motion of the rolling member will not be hindered by the resistance of the oil. The inertia body 12 shown in FIG. 5 includes the first wall 30 through fourth wall 33 that are the same as or similar to those described by FIG. 3. A first cover member 35 covering part or all of a side surface of the rolling member 13 is attached to the first wall 30 and the second wall 31. The first cover member 35 blocks a flow of oil directed from the other side in the axial direction toward the first diametrically large section 17 (directed in a direction shown by the arrow 34). As a result, the rolling motion of the rolling member 13 will not be hindered by the oil 34. Note that the first cover member 35 can be used both with a function of ensuring of rolling motion of the rolling member 13 and with a function of performing retention in the axial direction of the shaft 19 of the rolling member 13. The first cover member 35 may be provided integrally with the first wall 30 and the second wall 31, or may be provided as a separate member.

A second cover member 36 covering part or the entire side surface of the rolling member 13 is attached to the third wall 32 and the fourth wall 33. The second cover member 36 blocks a flow of oil directed from the other side in the axial direction toward the second diametrically large section 18 (directed in the direction shown by the arrow 34). Note that the second cover member 36 can be used both with a function of ensuring of rolling motion of the rolling member 13 and with a function of performing retention in the axial direction of the shaft 19 of the rolling member 13. The second cover member 36 may be provided integrally with the third wall 32 and the fourth wall 33, or may be provided as a separate member.

Moreover, facing inner surfaces of the first cover member 35 and the second cover member 36 may each be provided with the likes of a tapered surface or projection for performing an alignment function to draw the rolling member 13 toward the center in the axial direction of the inertia body 12 (the line P). Note that in FIG. 5, members that are the same as or similar to those described by FIGS. 1 and 2, are assigned with the same symbols as those assigned in FIGS. 1 and 2, and a detailed description of such members will be omitted here. Moreover, the first cover member 35 and the second cover member 36 are one example of a cover member in the embodiments of the present disclosure. Furthermore, the previously mentioned function of the first cover member 35 and the second cover member 36, in other words, the function for ensuring the rolling motion of the rolling member 13, may be provided also to the first restricting member 37 and the second restricting member 38 described by FIG. 3.

Next, the aligning section 47 will be described more specifically citing other embodiments. Note that the aligning section 47 of the present disclosure is not limited to the examples described below.

Figure 6:
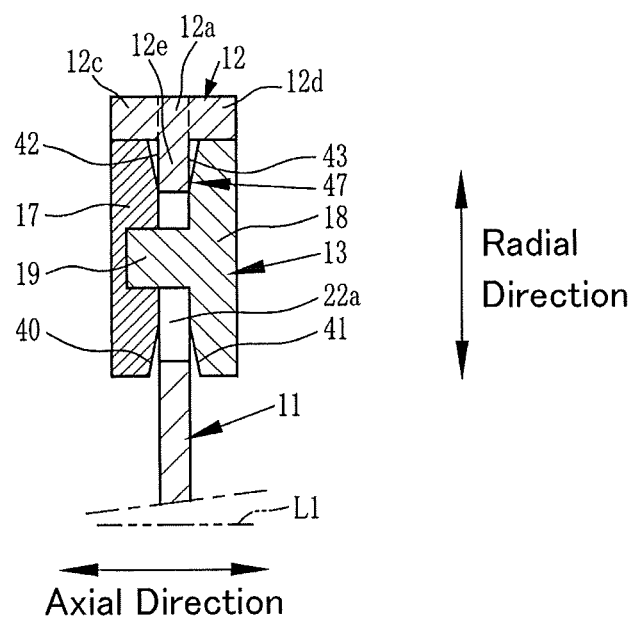
FIG. 6 is a cross-sectional view showing another example of an aligning section.

FIG. 6 is a cross-sectional view showing another example of the aligning section. In the example shown in FIG. 6, when compared to the example described by FIG. 2, facing surfaces of the first diametrically large section 17 and the second diametrically large section 18 are provided with a first tapered surface 40 and a second tapered surface 41. Both end surfaces 42, 43 in the axial direction L1, of the partition wall section 12e may be formed in a plane along the radial direction, for example, a vertical plane. In other words, in the example shown in FIG. 6, the tapered surfaces 40, 41 for alignment are provided on a rolling member 13 side. When the rolling member 13 moves outwardly in the radial direction along the guide groove 22a or when the rolling member 13 rolls along the first raceway surface 25 and the second raceway surface 26, the first tapered surface 40 abuts on the end surface 42 of the partition wall section 12e thereby aligning the rolling member 13 toward the center in the axial direction in the inertia body 12. When the rolling member 13 moves outwardly in the radial direction along the guide groove 22a or when the rolling member 13 rolls along the first raceway surface 25 and the second raceway surface 26, the second tapered surface 41 abuts on the end surface 43 of the partition wall section 12e thereby aligning the rolling member 13 toward the center in the axial direction in the inertia body 12. The tapered surfaces 40, 41 for alignment may be provided on part or an entire surface on an outside in the radial direction, of the facing surfaces of the first diametrically large section 17 and the second diametrically large section 18. Note that in FIG. 6, members that are the same as or similar to those described by FIGS. 1 and 2, are assigned with the same symbols as those assigned in FIGS. 1 and 2, and a detailed description of such members will be omitted here.

Figure 7:
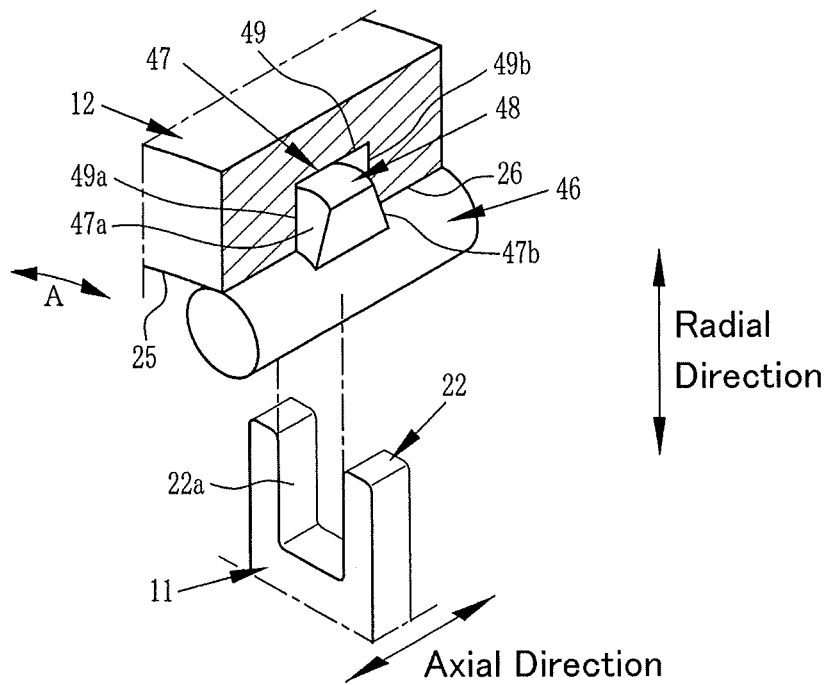
FIG. 7 is a perspective view showing another example of the aligning section.

FIG. 7 is a perspective view showing another example of the aligning section. In the example shown in FIG. 7, a rolling member 46 is formed in a circular columnar shape, and engages, at its outer circumferential surface, in the guide groove 22a. The rolling member 46 is guided outwardly in the radial direction by the guide groove 22a, due to a centrifugal force that acts by the rotary member 11 rotating. That outer circumferential surface of the rolling member 46 is provided with a projection 48 projecting outwardly in the radial direction. The projection 48 is disposed at a center in the axial direction in the outer circumferential surface of the rolling member 46, and has formed on its both sides in the axial direction a first tapered surface 47a and a second tapered surface 47b. A length in the circumferential direction of the rolling member 46 of the projection 48 is configured to be a length which is shorter than a total circumferential length of the rolling member 46. In other words, the length in the circumferential direction of the rolling member 46 in the projection 48 is configured to be a length that can allow a rotation required when the rolling member 46 rolls along the raceway surfaces 25, 26 within the guide groove 22a. A recess 49 entered by the projection 48 is formed between the first raceway surface 25 and the second raceway surface 26, in the inertia body 12. A length in the rotating direction A of the inertia body 12, of the recess 49 is formed with at least a length substantially the same as those of the raceway surfaces 25, 26. Note that in FIG. 7, members that are the same as or similar to those described by FIGS. 1 and 2, are assigned with the same symbols as those assigned in FIGS. 1 and 2, and a detailed description of such members will be omitted here.

Figure 8:
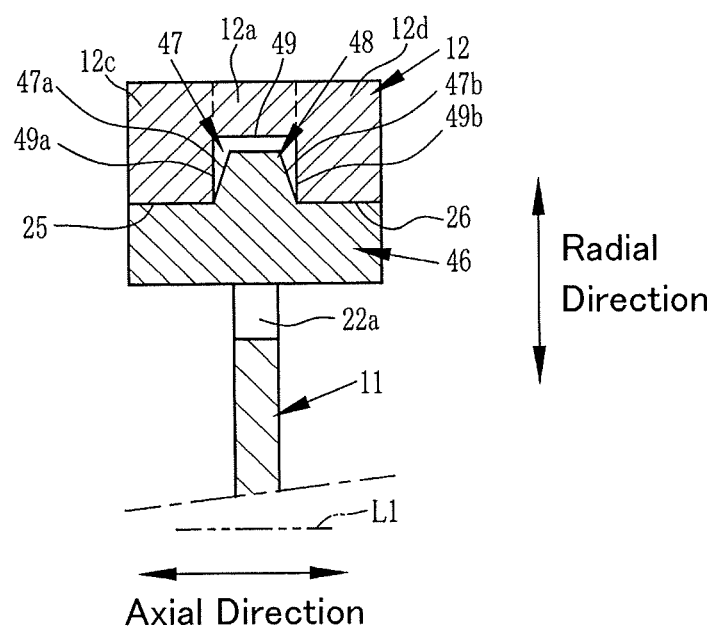
FIG. 8 is a cross-sectional view showing the aligning section of the example described by FIG. 7.

FIG. 8 is a cross-sectional view showing the aligning section of the example described by FIG. 7. As shown in FIG. 8, the recess 49 has a first surface 49a formed therein at a position facing the first tapered surface 47a of the projection 48, and, moreover, has a second surface 49b formed therein at a position facing the second tapered surface 47b of the projection 48. The first surface 49a and the second surface 49b may be formed, for example, in a plane along the radial direction, for example, in a vertical plane.

When the rolling member 46 moves outwardly in the radial direction or when the rolling member 46 rolls along the first raceway surface 25 and the second raceway surface 26, the first tapered surface 47a abuts on the first surface 49a thereby guiding the rolling member 46 toward the center in the axial direction. When the rolling member 46 moves outwardly in the radial direction or when the rolling member 46 rolls along the first raceway surface 25 and the second raceway surface 26, the second tapered surface 47b abuts on the second surface 49b thereby guiding the rolling member 46 toward the center in the axial direction. The projection 48 and the recess 49 configure the aligning section 47 that guides the inertia body 12 and the rolling member 46. Note that the first tapered surface 47a and the second tapered surface 47b may be provided on a recess 49 side. Moreover, although in the example shown in FIG. 8, description is made assuming a rotary member 11 that has provided to its support section 22 one guide groove 22a engaging with the center of the rolling member 46, the present invention is not limited to this, and there may be assumed, for example, a rotary member 11 that has provided to its support section 22 two guide grooves supporting both end sides of the rolling member 46.

Figure 9:
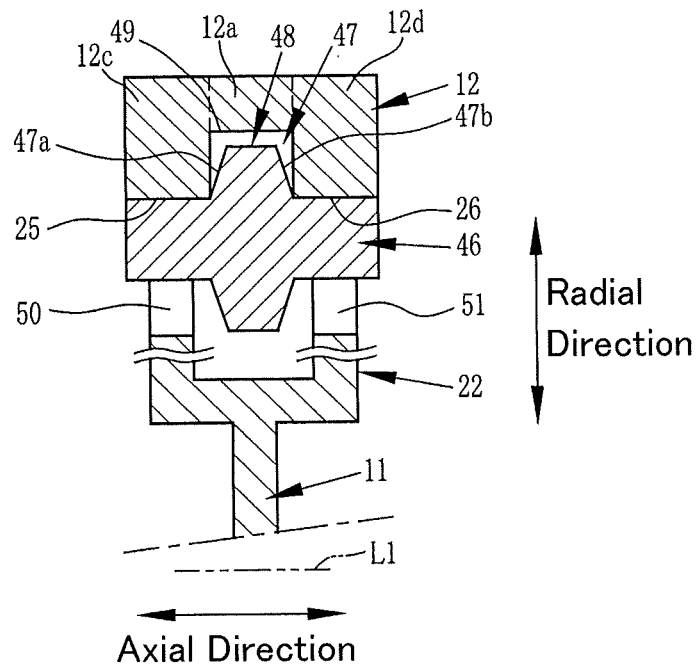
FIG. 9 is a cross-sectional view showing an example where two guide grooves have been provided.

FIG. 9 is a cross-sectional view showing an example where two guide grooves have been provided. The support section 22 shown in FIG. 9 is provided with two guide grooves, that is, a first guide groove 50 and a second guide groove 51. The first guide groove 50 and the second guide groove 51 engage with both ends of the rolling member 46 in a manner enabling the rolling member 46 to move in the radial direction. Due to this configuration, a mass on an outer side in the radial direction of the rotary member 11 can be made larger compared to in the embodiment shown in FIG. 7. Moreover, in this example, the projection 48 never abuts on the guide grooves 50, 51, so the projection 48 can be provided on an entire circumference of the rolling member 46. In this case, mass of the rolling member 46 can be made larger compared to in the embodiment shown in FIG. 8. Note that in FIG. 9, members that are the same as or similar to those described by FIG. 8, are assigned with the same symbols as those assigned in FIG. 8, and a detailed description of such members will be omitted here.

Figure 10:
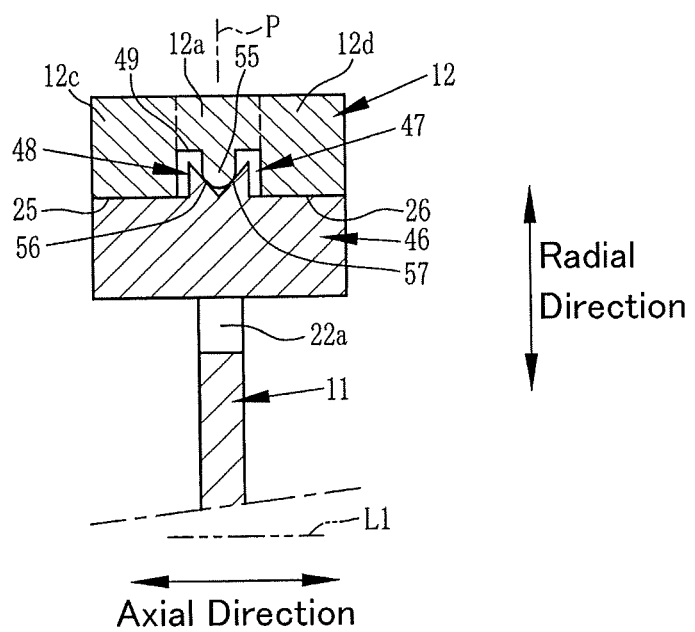
FIG. 10 is a cross-sectional view showing yet another example of the aligning section.

FIG. 10 is a cross-sectional view showing yet another example of the aligning section. The aligning section 47 shown in FIG. 10 is configured by a projection 55, a first tapered surface 56, and a second tapered surface 57. The projection 55 is provided to the recess 49 in such a manner as to project inwardly in the radial direction. The first tapered surface 56 and the second tapered surface 57 are provided in an M shape in cross section in the projection 48. The first tapered surface 56 and the second tapered surface 57 are provided in a valley shape with its center in the axial direction recessed. The first tapered surface 56 and the second tapered surface 57 forming the valley shape may be formed with left-right symmetry. A tip facing the first tapered surface 56 and the second tapered surface 57 in the projection 55 may be formed in an arc surface having a center of curvature on the line P passing through its center in the axial direction. Note that in FIG. 10, members that are the same as or similar to those described by FIG. 8, are assigned with the same symbols as those assigned in FIG. 8, and a detailed description of such members will be omitted here.

Figure 11:
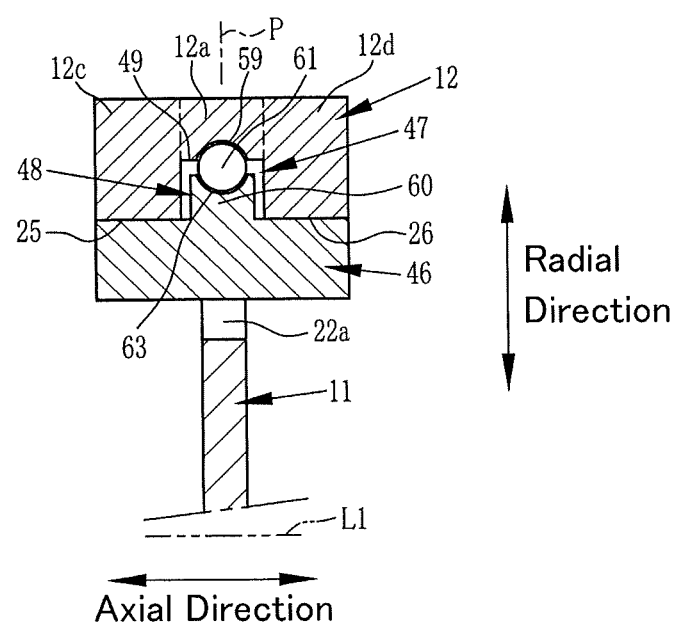
FIG. 11 is a cross-sectional view showing yet another example of the aligning section.

FIG. 11 is a cross-sectional view showing yet another example of the aligning section. The aligning section 47 shown in FIG. 11 is configured by: a spherical body 61; and the recess 49 and a projection 60 between which that spherical body 61 is sandwiched at its outside and its inside in the radial direction. The recess 49 is formed between the first raceway surface 25 and the second raceway surface 26 in the inertia body 12, and a groove 59 is formed in a surface sandwiching the spherical body 61, in the recess 49. A shape in the circumferential direction centered on the axis L1, of the groove 59 is formed in an arc shape having the same center of curvature as the raceway surfaces 25, 26. A length in the circumferential direction of that groove 59 is configured to be a length enabling the spherical body 61 to roll in response to rolling of the rolling member 46. An arc surface along the axial direction of the groove 59 may be formed by an arc surface having the same radius as the spherical body 61.

A spherical recessed surface 63 is formed in a surface sandwiching the spherical body 61, in the projection 60. The spherical recessed surface 63 is formed in an arc surface having its center of curvature on the line P. That arc surface may have its radius formed with the same radius as the spherical body 61. Note that the groove 59 and the spherical recessed surface 63 may be formed with a radius larger than the radius of the spherical body 61. In this case, the groove 59 and the spherical recessed surface 63 perform an action by which positions in the axial direction of the rolling member 13 and the inertia body 12 are restricted to a certain range centered on the line P in the axial direction. A depth along the radial direction, of the guide groove 22a is configured to be a depth that the rolling member 46 is guided in a manner preventing the spherical body 61 from escaping from the recess 49. Note that in FIG. 11, members that are the same as or similar to those described by FIG. 8, are assigned with the same symbols as those assigned in FIG. 8, and a detailed description of such members will be omitted here.

Forms for carrying out the present disclosure have been described above using embodiments. However, the present invention is of course not limited to the above-mentioned embodiments, and may be carried out in a variety of forms in a range not departing from the spirit of the present disclosure.

What is claimed is:

1. A torsional vibration damper, comprising:
    a rotary member that rotates by being inputted with a torque;
    an inertia body disposed on an outside in a radial direction of the rotary member so as to rotate freely in a circumferential direction centered on a rotational center axis of the rotary member; and
    a rolling member that couples the rotary member and the inertia body such that the rotary member rotates relative to the inertia body,
    wherein torsional vibration of the rotary member is suppressed by relative rotation of the inertia body with respect to the rotary member,
    the rotary member includes in an outer circumferential section thereof a plurality of support sections by which the rolling member is restricted in a rotating direction of the rotary member and is engaged movably in the radial direction of the rotary member, and
    the inertia body includes:
        a pair of mass sections that project toward both sides in a direction of the rotational center axis of the rotary member with respect to the rotary member; and
        a pair of raceway surfaces that are respectively provided on an inside in a radial direction of the pair of mass sections in a manner enabling the pair of raceway surfaces to be abutted on by the rolling member, the pair of raceway surfaces having a center of curvature in a place deviating from a rotational center of the rotary member.

2. The torsional vibration damper according to claim 1, comprising an aligning section by which at least one of the rolling member and the inertia body is moved in the direction of the rotational center axis of the rotary member.

3. The torsional vibration damper according to claim 2, wherein
    the rolling member includes:
        a shaft that engages in the support section; and
        a pair of circular sections having a larger diameter than the shaft provided on both sides sandwiching the shaft so as to respectively abut on the raceway surfaces, and
    the aligning section includes:
        a pair of surfaces that are faced by the pair of circular sections; and
        a tapered surface provided to at least one of a pair of surfaces on an inertia body side facing the pair of surfaces.

4. The torsional vibration damper according to claim 1, wherein the pair of mass sections are provided with a pair of restricting members that restrict the rolling member in the direction of the rotational center axis of the rotary member.

5. The torsional vibration damper according to claim 1, wherein
    the rolling member is lubricated by an oil, and
    the inertia body comprises a wall that prevents hindrance to rolling motion of the rolling member due to the oil.

6. The torsional vibration damper according to claim 1, wherein
    the rolling member is lubricated by an oil, and
    the inertia body comprises a cover member that prevents hindrance to rolling motion of the rolling member due to the oil.

\* \* \* \* \*